Sept. 25, 1923.
H. STUKART
SLICE CONVEYER FOR SLICING MACHINES
Filed June 26, 1922
1,469,055
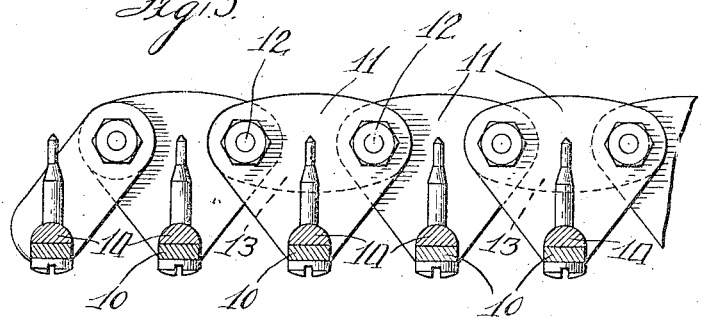
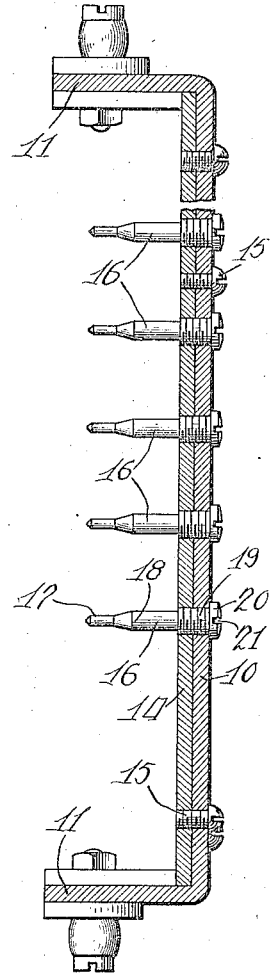
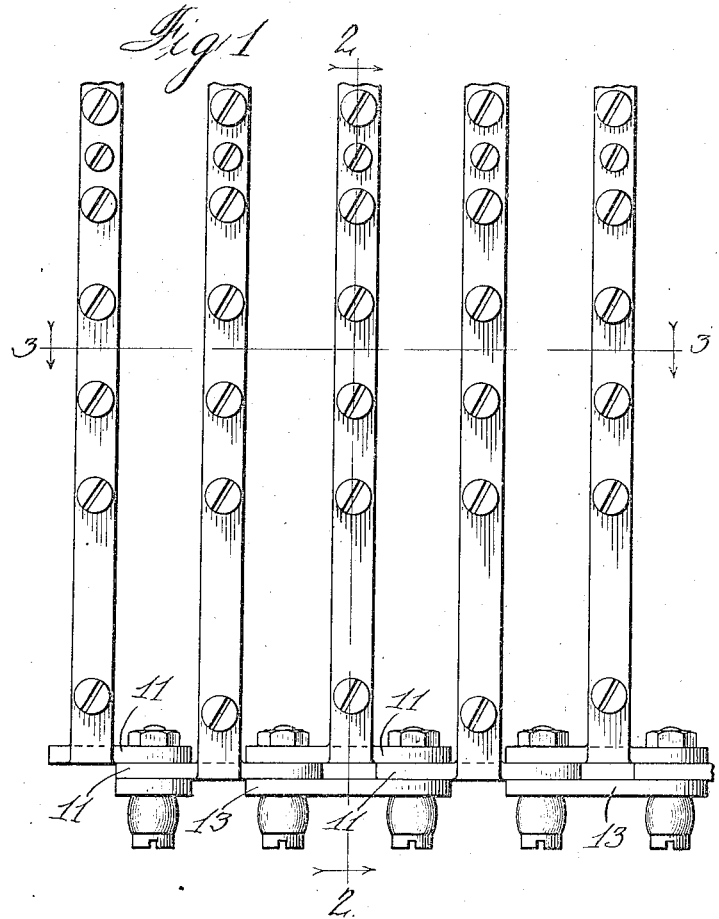
Witness:
Carl S. Magnusson
Inventor:
Hendrik Stukart
By Nissen & Crane
Attys Patented Sept. 25, 1923.

1,469,055

UNITED STATES PATENT OFFICE.

HENDRIK STUKART, OF LAPORTE, INDIANA, ASSIGNOR TO U. S. SLICING MACHINE COMPANY, OF LAPORTE, INDIANA, A CORPORATION OF INDIANA.

SLICE CONVEYER FOR SLICING MACHINES.

Application filed June 26, 1922. Serial No. 570,971.

*To all whom it may concern:*

Be it known that I, HENDRIK STUKART, a citizen of the United States, residing at Laporte, in the county of Laporte and State of Indiana, have invented certain new and useful Improvements in Slice Conveyers for Slicing Machines, of which the following is a specification.

This invention relates to conveyers for receiving slices of meat and other material as they are formed by a slicing machine and for transferring the slices to a position from which they may be discharged in an orderly arrangement upon a receiving table.

The invention has for its object the provision of a conveyer of the class named which shall be of improved construction and operation and which shall be economical to manufacture.

The invention is exemplified in the combination and arrangement of parts shown in the accompanying drawing and described in the following specification, and it is more particularly pointed out in the appended claims.

In the drawing—

Fig. 1 is an elevation of a portion of a slice conveyer showing one embodiment of the present invention;

Fig. 2 is a vertical section on line 2—2 of Fig. 1; and

Fig. 3 is a horizontal section on line 3—3 of Fig. 1.

In Patent No. 1,376,775, granted May 13, 1921, there is shown a form of conveyer for receiving slices of the same general nature as the present invention, which is the nature of an improvement of the conveyer there shown.

In the present invention upright bars 10 are formed from sheet metal and have integral laterally bent portions 11 at their upper and lower ends. The portions 11 are substantially triangular shape, as shown in Fig. 3, the uprights 10 being arranged at one apex of each triangle, while the other apices are pivoted to one another by pivot bolts 12. Links 13 engage the spaces between alternating parts of web or triangular shaped members 11. It will be apparent that the parts 10 and 11 can be stamped from sheet metal with very little labor.

Reinforcing bars 14 are connected to the inner upright faces of the bars 11 to provide a rounded finished surface and to strengthen the bars. These bars are held to one another by screws 15 and also by the pins 16 for receiving the slices. The pins 16 are especially designed so that they may be formed upon an automatic machine and so that they may be inserted by the use of a screw driver without the assistance of a wrench or other gripping tool. Each pin comprises a pointed portion 17 for entering the slice which is spaced from the uprights 10 and 14 by a shank 18 of somewhat larger diameter than the point. In the rear of the shank is a threaded portion 19 of still greater diameter, while the head 20 is the largest portion of the entire pin. The head 20 is slotted at 21 and the part 19 is threaded to enter threaded openings in the reinforcing strip 14. The parts 10 and 14 may be continuously threaded after they are placed together or the threads may be confined to the part 14 leaving an opening in part 10 of sufficient diameter to permit the threaded portion 19 to pass therethrough.

It will be apparent that the only operation necessary for inserting the pins 16 in position in the upright bars will be threading them through the openings in the bars. In case a pin is bent or broken it may be readily unscrewed with a screw driver and a new pin inserted.

I claim:—

1. A conveyer comprising parallel bars extending transversely of the direction of travel thereof, said bars having integrally formed enlarged web-shaped portions at the ends thereof bent at right angles to the bars and forming links of a conveyer chain, and reinforcing means for said bars the points at which said bars are bent to form the integral connection with said links being at the lateral edges of said links to locate said bars in offset relation to the pivot line of said chain.

2. A conveyer comprising a plurality of bars formed of sheet metal and extending transversely of the direction of travel of the conveyer, said bars having triangular portions of substantially the same thickness of said bars formed integrally with said bars at the ends thereof and extending at right angles thereto, said triangular portions being pivoted to one another to form the links of said conveyer, and reinforcing strips extending in the direction of the length of said bars and secured thereto.

3. A conveyer having a series of links provided with bars offset from the line of centers of said links, pins carried by said bars for engaging material to be carried by said conveyer, and an integrally formed individual head on each of said pins at the opposite sides of said bars from the material-engaging portions of said pins.

4. A conveyer comprising bars having threaded openings therethrough, pins having pointed ends, and threaded portions for engagement with said openings, said pins having heads thereon for engaging said bars at the side thereof opposite the pointed ends of said pins.

5. A conveyer comprising bars having reinforcing members extending longitudinally thereof and secured thereto, and pins having pointed ends for engaging material to be carried by said conveyer and having threaded portions for securing said bars and reinforcing members to one another.

6. A conveyer comprising a series of transverse bars having reinforcing members extending longitudinally thereof, registering openings through said bars and reinforcing members, and pins having threaded portions for securing said bars and reinforcing members to one another and for retaining said pins in position on said bars, said pins being arranged to project through said openings and having pointed ends for engaging material to be carried and having heads for engaging the faces of said bars opposite said pointed ends.

7. A slice-engaging pin having a pointed portion at one end thereof, a shank adjacent said pointed portion and of greater diameter than said pointed portion, a threaded portion adjacent said shank and of greater diameter than said shank, and a head of greater diameter than said threaded portion and at the end of said threaded portion opposite said shank.

8. A conveyer comprising a plurality of bars having triangular shaped webs extending at right angles to the bars at each end thereof, substantially half-round reinforcing members having their flat faces positioned against the faces of said bars on the side thereof adjacent said triangular members, and pins projecting through said bars and reinforcing members and having pointed ends extending from said bars in the direction of said triangularly shaped members, said pins having threaded portions for securing said bars to their reinforcing members and having slotted heads for engaging said bars at the sides thereof opposite said reinforcing members.

In testimony whereof I have signed my name to this specification on this 21st day of June, A. D. 1922.

H. STUKART.